US011651560B2

(12) United States Patent
Duan et al.

(10) Patent No.: US 11,651,560 B2
(45) Date of Patent: May 16, 2023

(54) METHOD AND DEVICE OF DISPLAYING COMMENT INFORMATION, AND MOBILE TERMINAL

(71) Applicant: Shanghai Bilibili Technology Co., Ltd., Shanghai (CN)

(72) Inventors: Yunpeng Duan, Shanghai (CN); Zhongying Tu, Shanghai (CN); Yingnan Sun, Shanghai (CN); Yahui Gong, Shanghai (CN); Bingtan Lu, Shanghai (CN); Weiyu Wang, Shanghai (CN); Bodi Shi, Shanghai (CN); Yong Luo, Shanghai (CN); Haibo Fang, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/073,957

(22) Filed: Oct. 19, 2020

(65) Prior Publication Data

US 2021/0118233 A1 Apr. 22, 2021

(30) Foreign Application Priority Data

Oct. 22, 2019 (CN) .......................... 201911007282.7

(51) Int. Cl.
*G06T 19/00* (2011.01)
*G06T 7/70* (2017.01)
(Continued)

(52) U.S. Cl.
CPC ............ *G06T 19/006* (2013.01); *G06F 18/24* (2023.01); *G06T 7/70* (2017.01); *G06V 20/20* (2022.01);
(Continued)

(58) Field of Classification Search
CPC ............ G06F 3/04842; G06F 3/04817; G06F 3/0482; G06K 9/00671; G06K 9/6267;
(Continued)

(56) References Cited

U.S. PATENT DOCUMENTS 7,131,060 B1 * 10/2006 Azuma .................. G06T 11/60
715/260
9,147,221 B2 * 9/2015 Grasset .................... G06T 1/00
(Continued)

FOREIGN PATENT DOCUMENTS

| CN | 106982387 A | 7/2017 |
|---|---|---|
| CN | 108347657 A | 7/2018 |
| CN | 108629843 A | 10/2018 |

*Primary Examiner* — Jin Cheng Wang
(74) *Attorney, Agent, or Firm* — BakerHostetler

(57) ABSTRACT

The present disclosure describes techniques for displaying comment information. The disclosed techniques comprise determining position information of a mobile terminal in a first coordinate system, the mobile terminal comprising a camera, a focus point of the camera being an origin of the first coordinate system; determining first position information associated with at least one comment in the first coordinate system based on the position information of the mobile terminal; converting the first position information associated with the at least one comment to second position information associated with the at least one comment in a second coordinate system based on one or more predetermined rules; obtaining the at least one comment; and displaying the at least one comment based on the second position information associated with the at least one comment in the second coordinate system.

17 Claims, 8 Drawing Sheets

(51) Int. Cl.
*G06V 20/20* (2022.01)
*H04L 67/52* (2022.01)
*G06F 18/24* (2023.01)
*H04L 67/02* (2022.01)
*G06F 3/04842* (2022.01)

(52) U.S. Cl.
CPC .......... *H04L 67/52* (2022.05); *G06F 3/04842* (2013.01); *G06T 2207/30244* (2013.01); *H04L 67/02* (2013.01)

(58) Field of Classification Search
CPC .......... G06K 2009/3225; G06T 19/006; G06T 2207/30244; G06T 2207/30204; G06T 7/70; G06T 15/20
See application file for complete search history.

(56) References Cited

U.S. PATENT DOCUMENTS

| | | | | |
|---|---|---|---|---|
| 9,361,733 B2* | 6/2016 | Lee | .................. | G09G 3/003 |
| 10,115,210 B2* | 10/2018 | Kasahara | ................ | G06T 11/00 |
| 2012/0057794 A1* | 3/2012 | Tsurumi | ................ | G06T 19/006 |
| | | | | 382/195 |
| 2012/0210255 A1* | 8/2012 | Ooi | .................. | G06T 19/20 |
| | | | | 715/762 |
| 2014/0196082 A1* | 7/2014 | Maruyama | .......... | H04N 21/4788 |
| | | | | 725/32 |
| 2014/0215512 A1* | 7/2014 | Maruyama | ....... | H04N 21/44008 |
| | | | | 725/34 |
| 2015/0062163 A1* | 3/2015 | Lee | ................. | G06T 19/006 |
| | | | | 345/633 |
| 2015/0262428 A1* | 9/2015 | Tatzgern | ............... | G06V 20/20 |
| | | | | 345/633 |
| 2015/0302649 A1* | 10/2015 | Komatsu | ............ | G06K 9/00671 |
| | | | | 345/633 |
| 2016/0035135 A1* | 2/2016 | Park | ................ | G06T 19/006 |
| | | | | 345/633 |
| 2018/0143756 A1* | 5/2018 | Mildrew | .............. | G06T 19/003 |
| 2018/0374270 A1* | 12/2018 | Kuriya | .................. | G06F 3/013 |
| 2020/0037034 A1* | 1/2020 | Greyling | ............ | H04N 21/4314 |
| 2020/0082581 A1* | 3/2020 | Chen | ....................... | G06T 11/60 |
| 2020/0090409 A1* | 3/2020 | Fink | ..................... | G06T 19/006 |
| 2020/0210704 A1* | 7/2020 | Han | ........................ | G06K 9/6215 |
| 2020/0257245 A1* | 8/2020 | Linville | .................. | G06F 3/017 |
| 2021/0058547 A1* | 2/2021 | Puttamalla | ............. | H04N 23/60 |
| 2021/0166661 A1* | 6/2021 | Wakabayashi | ........... | G09G 5/38 |
| 2021/0271383 A1* | 9/2021 | Yang | ...................... | G09G 5/38 |

* cited by examiner

METHOD AND DEVICE OF DISPLAYING COMMENT INFORMATION, AND MOBILE TERMINAL

CROSS-REFERENCE TO RELATED APPLICATION

The present application claims priority of Chinese patent application No. 201911007282.7, filed on Oct. 22, 2019. The entire disclosure of the above-identified application is hereby incorporated by reference herein and made a part of this specification.

BACKGROUND

The comment information can appear in the playback interface of a video by scrolling, staying or other special effects, and its content is usually a short comment sent by a user watching the video. In the prior art, the display of the comment information is mainly realized by superimposing the comment information in the video playback interface.

SUMMARY

Aiming at the problem that the comment information is only displayed in the playback interface and the users' interactions are relatively simple in the existing method of displaying comment information, a method and a device of displaying comment information, a mobile terminal and a computer-readable storage medium are provided now.

The present invention provides a method of displaying comment information, comprising:

obtaining camera position information of a mobile terminal located in a camera coordinate system;

converting the camera position information to a spatial position information located in a world coordinate system;

obtaining comment information to be displayed; and displaying the comment information to be displayed according to the spatial position information.

Optionally, the step of converting the camera position information to the spatial position information located in the world coordinate system comprises:

calculating comment generating position information of the comment information to be displayed in the camera coordinate system according to the camera position information; and determining the spatial position information according to the comment generating position information.

Optionally, the step of displaying the comment information to be displayed according to the spatial position information comprises:

obtaining a motion track and a motion speed of the comment information to be displayed; and playing the comment information to be displayed according to the motion track and the motion speed.

Optionally, the step of obtaining the comment information to be displayed further comprises:

obtaining an object image of an object to be recognized;

recognizing the object image through an object recognition technology to obtain a category of the object to be recognized; and obtaining comment information relating to the category of the object from a server according to the category of the object, the comment information is the comment information to be displayed.

Optionally, the step of obtaining the comment information to be displayed comprises:

obtaining geographical location information of the mobile terminal; and obtaining comment information relating to the geographical location information from a server according to the geographical location information, the comment information is the comment information to be displayed.

Optionally, the comment information comprises geographical comment information and/or video URL information.

Optionally, the comment information to be displayed comprises a hyperlink comment, the method further comprises:

displaying a page corresponding to the hyperlink comment when a user's click operation on a played hyperlink comment is received.

An embodiment of the present invention provides a device of displaying comment information, comprising:

a position obtaining module, obtaining camera position information of a mobile terminal located in a camera coordinate system;

a determining module, converting the camera position information to spatial position information located in a world coordinate system;

a comment obtaining module, obtaining a comment information to be displayed; and a playing module, displaying the comment information to be displayed according to the spatial position information.

The present invention further provides a mobile terminal, comprising a memory, a processor and computer programs stored in the memory and capable executed by the processor, when the computer programs are executed by the processor, the steps of the above method are realized.

The present invention further provides a computer-readable storage medium, computer programs are stored upon, when the computer programs are executed by a processor, the steps of the above method are realized.

Advantages of the above technical solutions comprise:

The present technical solution obtains camera position information of the mobile terminal located in a camera coordinate system; converts the camera position information to spatial position information located in a world coordinate system; obtains comment information to be displayed; and displays the comment information to be displayed according to the spatial position information. The embodiment of the present invention displays the comment information through the Augmented Reality (AR) technology, so that the comment information can be displayed in the real space to make the user can truly experience the feeling of the comment floating in the air and improve the user experience, in addition, displaying the comment information through the AR technology; enables more diverse interactions.

DETAILED DESCRIPTION OF ILLUSTRATIVE EMBODIMENTS

The advantages of the present invention are further described below in conjunction with the drawings and specific embodiments.

Exemplary embodiments will be described in detail herein and are shown in attached drawings. When the following description relates to the attached drawings, the same numbers in different drawings refer to the same or similar elements, unless otherwise indicated. The embodiments described in the following exemplary embodiments do not represent all embodiments consistent with the present disclosure. On the contrary, they are only examples of devices and methods consistent with some aspects of the present disclosure as detailed in the attached claims.

The terms used in the present disclosure are only for the purpose of describing specific embodiments, and are not intended to limit the present disclosure. The singular forms "a", "said" and "the" used in the present disclosure and the attached claims are also intended to include plural forms, unless the context clearly indicates other meanings. It should also be understood that the term "and/or" used herein refers to and includes any or all possible combinations of one or more associated listed items.

It should be understood that although the terms "first", "second", "third" and the like may be used in the present disclosure to describe various information, such information shall not be limited to these terms. These terms are only used to distinguish the same category of information from each other. For example, without departing from the scope of the present disclosure, the first information may also be referred to as the second information, and similarly, the second information may also be referred to as the first information. Depending on the context, the word "if" as used here can be interpreted as "when" or "in response to determination".

In the description of the present invention, it should be understood that the numerical label before the steps does not identify a sequence of execution of the steps, and is only used to facilitate the description of the present invention and distinguish each step, and therefore it cannot be understood as a limitation of the present invention.

Figure 1:
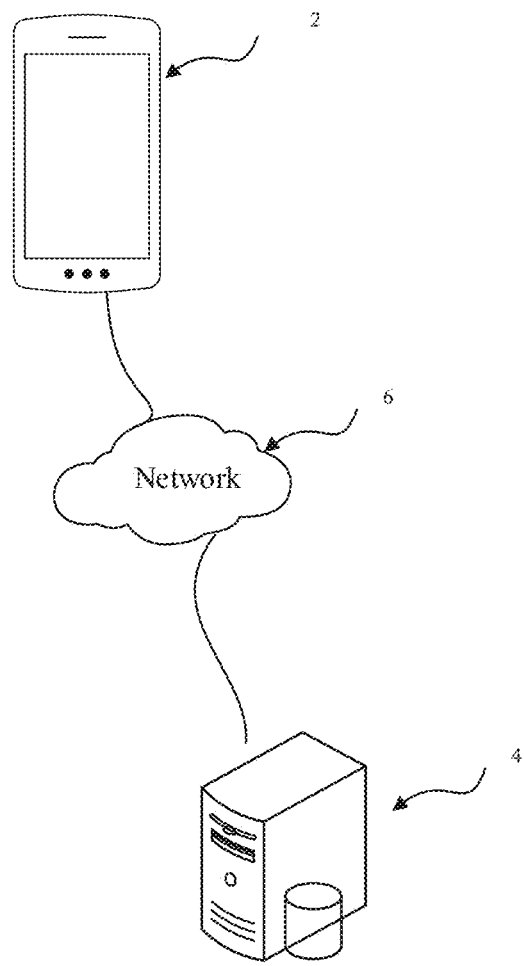
FIG. 1 is a frame diagram of an embodiment of a system of comment information display of the present invention.

Please refer to FIG. 1, FIG. 1 is a schematic diagram of an application environment according to a method of displaying comment information of an embodiment of the present application. In an exemplary embodiment, a mobile terminal 2 can obtain data from a server 4 through a network 6. The mobile terminal 2 may be an electronic device with a data sending function, such as a mobile phone, a tablet personal computer, a laptop computer, a notebook computer, and a desktop computer and so on. The network 6 may be the Internet.

First Embodiment

Figure 2:
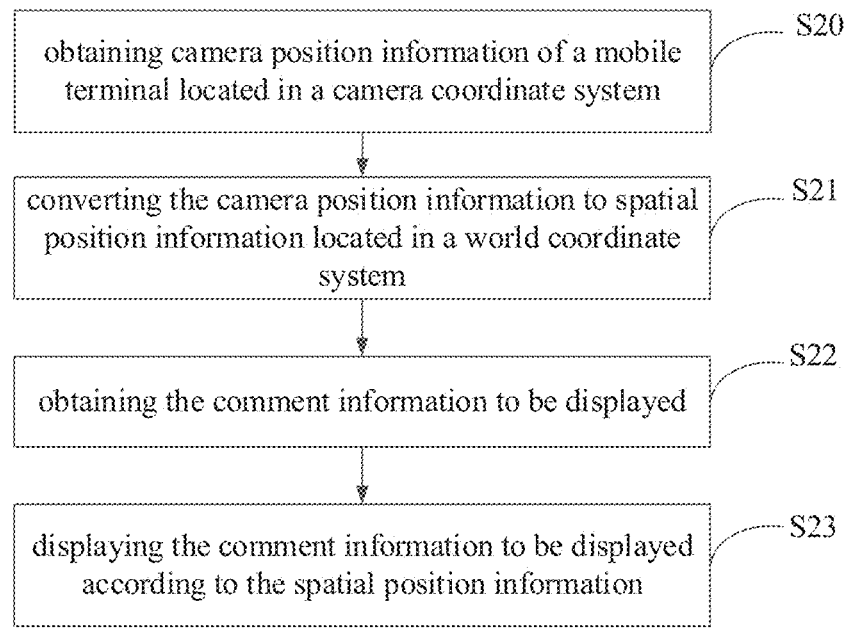
FIG. 2 is a flowchart of an embodiment of a method of displaying comment information of the present invention.

FIG. 2 schematically shows a flowchart of a method of displaying comment information according to a first embodiment of the present application. It can be understood that the flowchart in this embodiment is not used to limit the order of execution of the steps. The following is an exemplary description with the mobile terminal 2 as the executive body.

As shown in FIG. 2, the method of displaying comment information includes steps S20~S23, wherein:

Step S20, obtaining camera position information of a mobile terminal located in a camera coordinate system.

Specifically, the camera position information indicates a coordinate of the mobile terminal in the camera coordinate system. In this embodiment, when the mobile terminal uses AR to display the comment information, it will start AR comment program and call its own optical system, such as a camera set including lens, shutter, image sensors, etc., an inertial measurement unit (IMU) and AR software tool development kits to collect and calculate position information (x, y, z) and directions (pitch, yaw, and roll) of the device, wherein, the IMU can be an accelerometer or a gyroscope. Wherein, the AR technology refers to the technology that allows a virtual world in the screen to be combined and interacted with the real world scene through calculation of positions and angles of the camera image and image analysis technology.

It should be noted that the position information (x, y, z) is the coordinate in the camera coordinate system.

Among them, the camera coordinate system is a three-dimensional rectangular coordinate system established with the focus center of the camera as an origin and the optical axis as a Z axis. The origin of the camera coordinate system (an observation coordinate system), is an optical center of the camera, an x axe and a y axe are parallel to an X axe and a Y axe of an image, and a z axis is the optical axis of the camera, which is perpendicular to an image plane. An intersection of the optical axis and the image plane is an origin of the image coordinate system, the image coordinate system is a two-dimensional rectangular coordinate system.

Step S21, converting the camera position information to spatial position information located in a world coordinate system.

Specifically, the spatial position information is a coordinate of the comment information to be displayed in the world coordinate system. The coordinate in the camera coordinate system can be converted to the coordinate in the world coordinate system through a conversion formula between the camera coordinate system and the world coordinate system.

Figure 3:
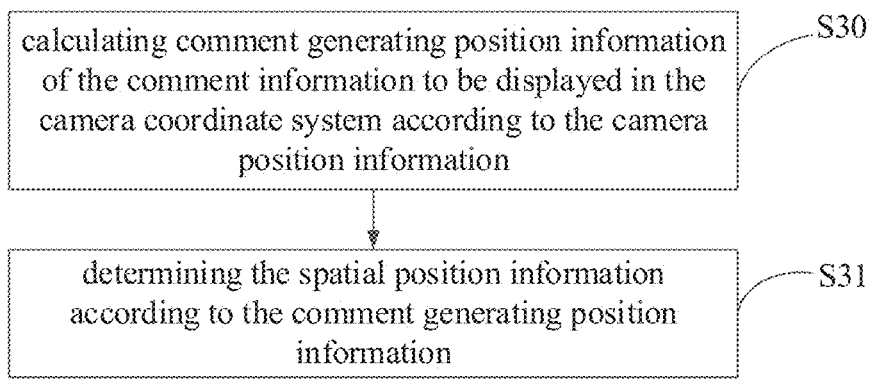
FIG. 3 is a specific flowchart of the step of converting the camera position information to spatial position information located in a world coordinate system in FIG. 2 of the present invention.

In an exemplary embodiment, referring to FIG. 3, the step of converting the camera position information into the spatial position information in the world coordinate system includes steps S30~S31, wherein:

Step S30, calculating comment generating position information of the comment information to be displayed in the camera coordinate system according to the camera position information.

Specifically, the comment generating position information is a coordinate of the comment information to be displayed in the camera coordinate system.

In this embodiment, in order to display the comment information more randomly and dispersedly, an initial position of a comment display can be optimized, that is, a venerating position of the comment can be preset. In one embodiment, the initial position optimization can be performed specifically using the following methods: firstly, the camera position information of the mobile terminal is obtained, wherein, in the camera coordinate system, the camera position information is represented by a homogeneous coordinate system as $$p1 = \begin{bmatrix} x1 \\ y1 \\ z1 \\ 1 \end{bmatrix};$$

secondly, after the camera position information of the mobile terminal is obtained, through a translation and/or a rotation transformation to the camera position p1, and finally position information is obtained after the translation and/or the rotation transformation is calculated, and the position information is served as random and scattered comment generating position information, wherein, in the camera coordinate system, transformed camera position information is represented by the homogeneous coordinate system as $$p2 = \begin{bmatrix} x2 \\ y2 \\ z2 \\ 1 \end{bmatrix}.$$

in this embodiment, a specific distance of translation and a rotation angle can be preset or set by a user, which is not limited in this embodiment.

Step S31, determining the spatial position information according to the comment generating position information.

Specifically, a transformation relationship of the comment information to be displayed is pre-stored in the mobile terminal, the transformation relationship is used to determine the generating position of the comment information to be displayed. Exemplarily, the transformation relationship may be: translating 'a' units to the x-axis and rotating angle 'b' in the pitch direction. In this embodiment, the transformation relationship can be correspondingly changed according to a movement and a rotation of the camera. A changed transformation relationship may be automatically maintained by the operating system and SDK of the mobile terminal.

After the comment generating position information is obtained, the spatial position information corresponding to the comment generating position information can be calculated according to the transformation relationship. In other words, the conversion between the camera coordinate system and the world coordinate system is calculated according to this transformation relationship.

Step S22, obtaining the comment information to be displayed.

Specifically, the comment (barrage), refers to the commentary subtitles that pop up when watching videos on the Internet. Similar to the criticism between the lines in the novel, the comments floating across the screen in the video are called the comment, which originally meant to provide intensive shelling with a large or small amount of artillery. The comment, as the name suggests, refers to a curtain formed by a large number of bullets, when a large number of complaints float across the screen, the effect looks like comments in a flying shooting game.

The comment information to be displayed is the user's comment information. In an embodiment, the comment information may specifically refer to a user's comment on a certain item, or a user's comment on a certain place, or a user's comment on a certain event. In this embodiment, the comment information may be represented in a text form, in another embodiment, the comment information may also be represented in any form that can be converted into a 3D model, such as pictures, 3D models or videos.

The comment information to be displayed is stored in a server, when the comment information needs to be displayed, the comment information to be displayed can be obtained from the server through a comment obtaining instruction.

Figure 4:
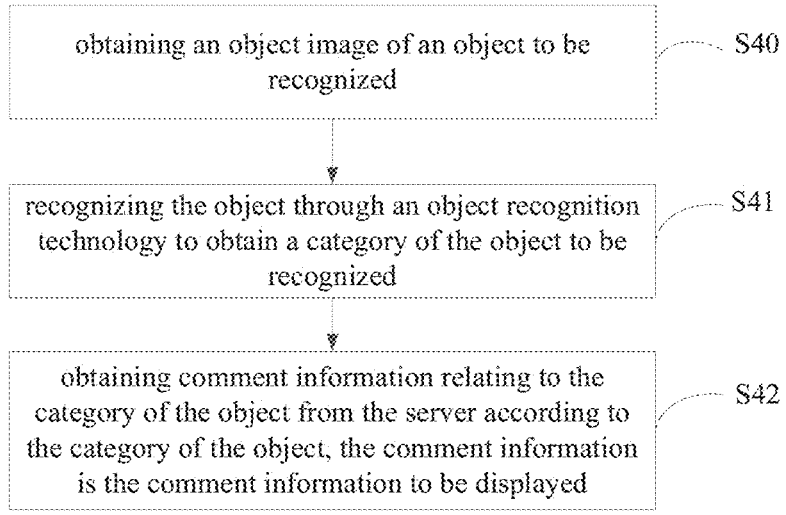
FIG. 4 is a specific flowchart of the step of obtaining comment information to be displayed in FIG. 2 of the present invention.

In an exemplary embodiment, referring to FIG. 4, the step of obtaining the comment information to be displayed includes S40 to S42, wherein:

Step S40, obtaining an object image of an object to be recognized.

Specifically, when the user needs to obtain the user's comment information for a certain object to be recognized, the user can take a photo of the object to be recognized through the camera of the mobile terminal, so that the mobile terminal can obtain the object image of the object to be recognized. In another embodiment, the object image of the object to be recognized can also be directly obtained from an album in the mobile terminal.

Step S41, recognizing the object image through an object recognition technology to obtain a category of the object to be recognized.

Specifically, an object recognition model trained by Deep Learning technology can be used to perform image recognition on the object image, thereby the category of the object is identified. During a training process of the object recognition model, in order to improve accuracy of model recognition, pictures in a used training sample data set can be performed data enhancement processing to the pictures in a sample data set by clipping, rotating and other methods, thereby improving diversity of the sample data set and making the object recognition models trained through the training sample data set have a better recognition rate.

Step S42, obtaining comment information relating to the category of the object from the server according to the category of the object, the comment information is the comment information to be displayed.

Specifically, after the category of the object is recognized, category information of the object is transmitted to the server, then the server searches for comment information associated with the category of the object according to the acquired category information of the object.

Exemplarily, the category of the object takes a hand-made good as an example, when the user sees a hand-made product, the user can take a picture of the hand-made product through the mobile terminal, and then the mobile terminal recognizes the picture of the hand-made product, after the category of the picture of the hand-made product is recognized, the category information of the picture of the hand-made product is transmitted to the server, the server finds the comment information associated with the hand-made product according to the category information. Among them, the mobile terminal can use off-line image recognition technology to recognize the hand-made good to obtain a higher-quality data set and improve recognition accuracy.

It is understandable that each user can publish comment information on the hand-made product through a user interface of playing the comment information to be displayed, after the user publishes the comment information through the user interface, the mobile terminal transmits the comment information to the server, the server saves the relationship between the user comment information and the corresponding hand-made product in a comment database.

Figure 10:
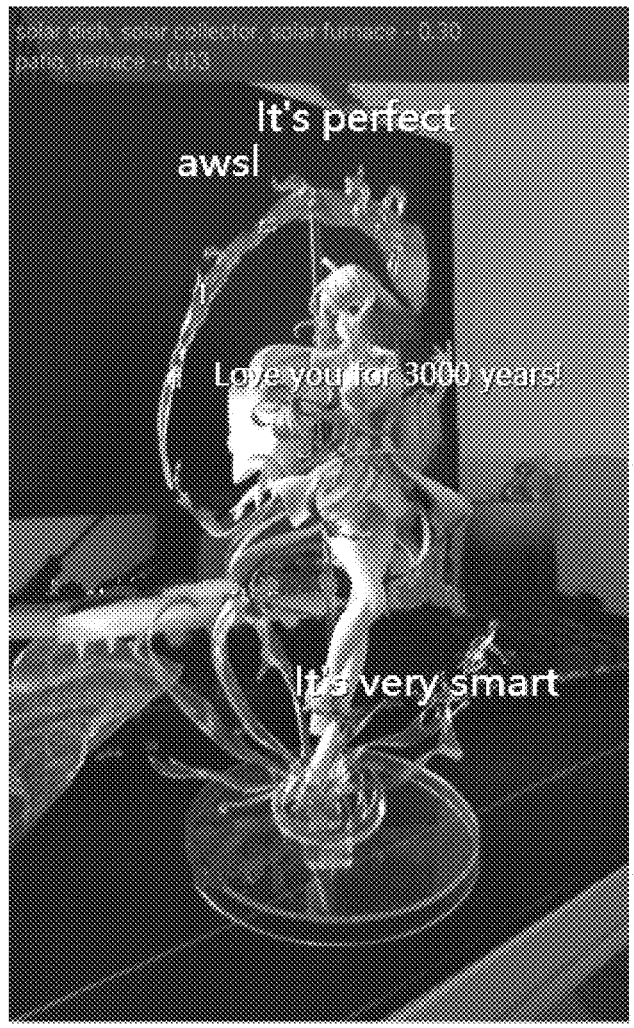
FIG. 10 is a schematic diagram of an interface of comment information display of the present invention.

After the comment information is obtained, the comment information can be displayed, in a specific embodiment, displayed comment information is as shown in FIG. 10.

Figure 5:
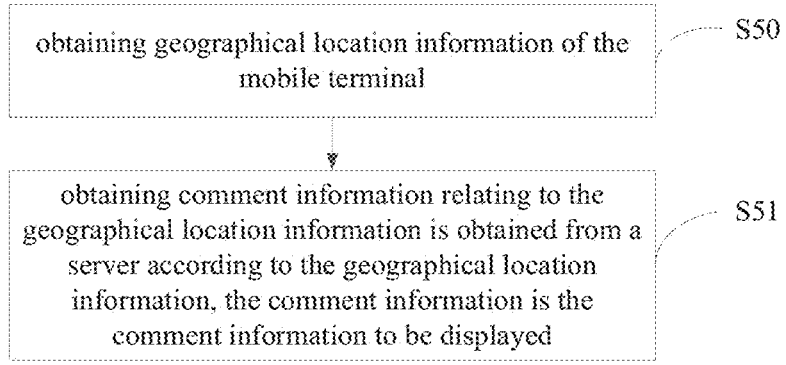
FIG. 5 is a specific flowchart of the step of obtaining comment information to be displayed in FIG. 2 of the present invention.

In another exemplary embodiment, referring to FIG. 5, the step of obtaining the comment information to be displayed includes S50~S51, wherein:

Step S50, obtaining geographical location information of the mobile terminal.

Specifically, the geographic location information where the mobile terminal is located can be obtained by calling a positioning module of the mobile terminal.

Step S51, obtaining comment information relating to the geographical location information is obtained from a server according to the geographical location information, the comment information is the comment information to be displayed.

Specifically, when a user publishes comment information, the geographic location where the user published the comment information can be obtained, after the user posts the comment information through the mobile terminal, the mobile terminal uploads the comment information containing the geographic location information to the server, after receiving the comment information containing the geographic location information, the server stores the comment information containing the geographic location information. It is understood that after the server stores the comment information containing the geographic location information, the background manager can review the comment information containing the geographic location information published by the user, and can delete the comment information when the comment information is inappropriate.

Since the comment information posted by the user includes the geographic location information, after the geographic location information of the mobile terminal is obtained, comment information associated with the geographic location information can be obtained from the server according to the geographic location information.

In this embodiment, the comment information can be location comment information, that is, a user's comment on a certain location, the location comment can be presented in the text form or in any form that can be converted into a 3D model, such as pictures, 3D models or videos. When the comment information exists in the form of a video, the comment information also includes video Uniform Resource Locator (URL) information of the video.

Exemplarily, when a user eats at a restaurant, the user can post comment information on the restaurant, for example, the food of the restaurant tastes good, the user can also publish a video of the environment of the restaurant. When the user posts the comment information through the mobile terminal, the mobile terminal obtains the geographic location information where the user posts the comment information, and then uploads the comment information containing the geographic location information to the server. In this way, after the geographic location information is obtained, the mobile terminal can obtain the comment information associated with the geographic location information from the server according to the geographic location information obtained.

It is understood that each user can post location comment information on a certain location through a user interface of playing the comment information to be displayed, after the user posts the location comment information through the user interface, the mobile terminal transmits the location comment information to the server, the server saves the user's location comment information and the corresponding geographic location information to the comment database. When the comment information posted by the user is a video, after the mobile terminal uploads the video to the server, the server associates the URL information corresponding to the video with the corresponding geographic location information and saves them in the comment database.

Figure 11:
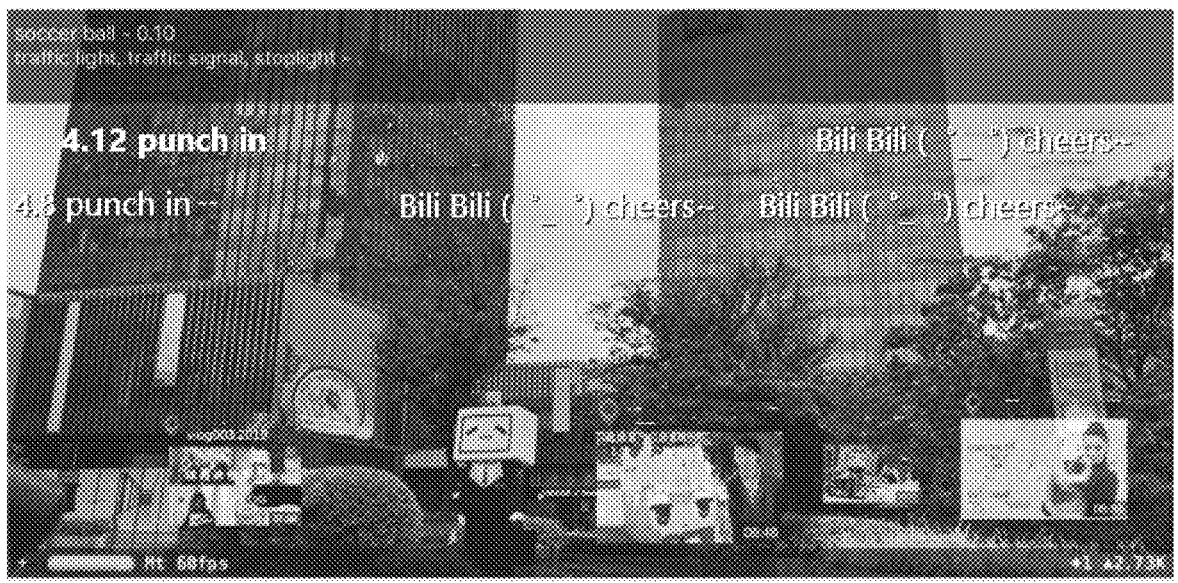
FIG. 11 is a schematic diagram of another interface of comment information display of the present invention.

After the comment information is obtained, the comment information can be displayed, in a specific embodiment, the displayed comment information is shown in FIG. 11.

Step S23, displaying the comment information to be displayed according to the spatial position information.

Specifically, after the spatial location information of the comment information to be displayed is obtained, the mobile terminal can play each piece of the comment information to be displayed according to a display size, a font color, a font format and display effects of each piece of the comment information, wherein the display special effects include dwell, scroll or other special effects.

Figure 6:
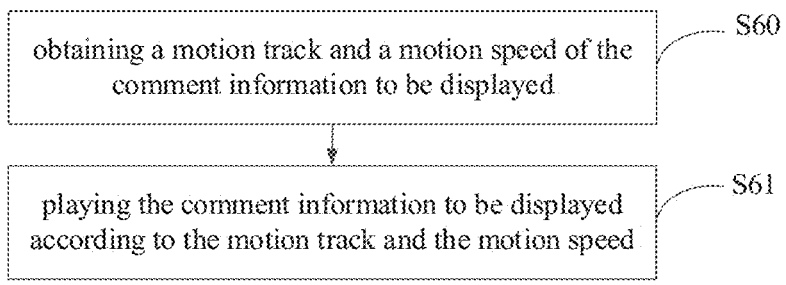
FIG. 6 is a specific flowchart of the step of displaying the comment information to be displayed according to the spatial position information in FIG. 2 of the present invention.

In an exemplary embodiment, referring to FIG. 6, the step of displaying the comment information to be displayed according to the spatial position information includes S60~S61, wherein:

Step S60, obtaining a motion track and a motion speed of the comment information to be displayed.

Step S61, playing the comment information to be displayed according to the motion track and the motion speed.

Specifically, the movement track and movement speed of the comment information can be preset, for example, the preset movement track of the comment, relative to the current position of the camera, is from right to left, and a movement vector is denoted as 'a', after the preset movement vector 'a' is obtained, the preset movement vector 'a' is converted into a vector 'a''' in the world coordinate system.

After the spatial position information of the comment information to be displayed is obtained and the vector 'a''' in the world coordinate system corresponding to the movement track of the comment is calculated, a comment model is generated in the spatial position information, then the comment model is moved with a movement speed S according to the vector 'a''' in the world coordinate system, thereby completing the playback of the comment information to be displayed.

In this embodiment, based on different operating systems or SDKs, different degrees of self-defined effects of the comment model can be achieved. For example, different fonts, colors, lighting shadow effects and so on can be applied to the comment model, in addition to a text model, image textures can be used to cover the 3D model.

In one embodiment, after the comment is moved to a preset position, comment resources can be recovered.

In another embodiment, after the comment information is displayed, the user can perform interactive operations on the comment information, for example, the user can change the movement track of a comment by clicking or sliding operations. For example, the user can switch the movement the track of one comment to another movement track through a sliding operation, after the user's switching operation on the movement track of the comment is received, the mobile terminal can re-determine a direction vector corresponding to the movement track of the comment according to the user's sliding operation; after a directional vector corresponding to a new movement track is determined, the directional vector is converted to a directional vector in the corresponding world coordinate system, and finally the comment information is played according to the directional vector in the world coordinate system.

In this embodiment, the camera position information of the mobile terminal in the camera coordinate system is obtained; the camera position information is converted into spatial position information in the world coordinate system; the comment information to be displayed is obtained; and the comment information to be displayed is displayed according to the spatial position information. The embodiment of the present invention displays the comment information through the Augmented Reality (AR) technology, so that the comment information can be displayed in the real space to make the user can truly experience the feeling of the comment floating in the air and improve the user experience, in addition, displaying the comment information through the AR technology enables more diverse interactions.

Second Embodiment

Figure 7:
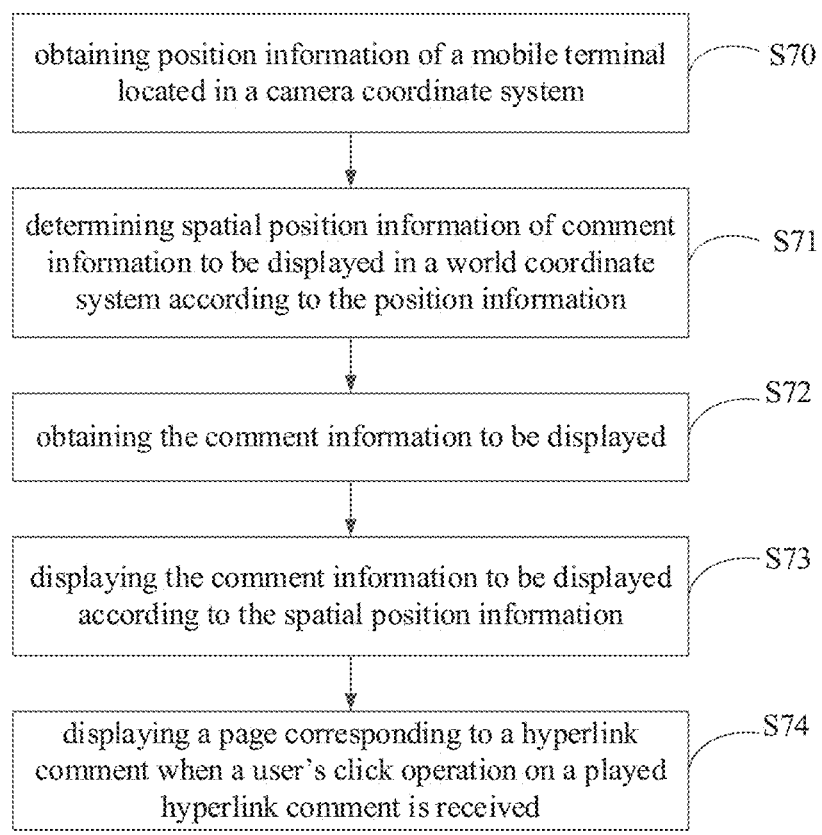
FIG. 7 is a flowchart of another embodiment of the method of displaying comment information of the present invention.

FIG. 7 is a flowchart of a method of displaying comment information according to a second embodiment of the present disclosure. The method of displaying comment information further includes steps S70~S74, wherein:

Step S70, obtaining camera position information of a mobile terminal located in a camera coordinate system.

Step S71, converting the camera position information to spatial position information located in a world coordinate system.

Step S72, obtaining comment information to be displayed.

Step S73, displaying the comment information to be displayed according to the spatial position information.

Specifically, steps S70~S73 in this embodiment are substantially the same as steps S20~S23 in the first embodiment, and will not be repeated in this embodiment.

Step S74, displaying a page corresponding to a hyperlink comment when a user's click operation on a played hyperlink comment is received.

Specifically, the comment information to be displayed may be the hyperlink comment, when the comment information to be displayed includes a hyperlink comment, the user can click on the hyperlink comment played in the video interface, after the user's click operation on the hyperlink comment is received, the mobile terminal obtains corresponding page contents according to the hyperlink and displays the page contents.

In this embodiment, by providing the hyperlink comment, the user can click on the hyperlink comment to enter the page corresponding to the hyperlink, thereby increasing interactive manners of the comment and improving user experience.

Third Embodiment

Figure 8:
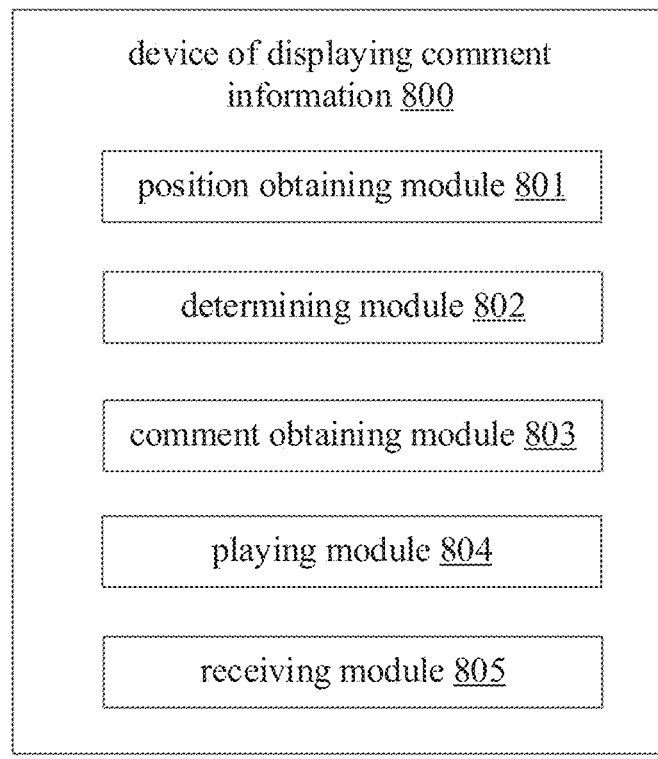
FIG. 8 is a schematic diagram of an embodiment of functional blocks of a device of displaying comment information of the present invention.

FIG. 8 is a schematic diagram of functional blocks of a device of displaying comment information according to a third embodiment of the present application, the device of displaying comment information can be divided into one or more program modules, the one or more program modules are stored in a storage medium and are performed by one or more processors to complete the present application. The program modules in the embodiment of the present application refer to a series of computer program instruction segments that can complete specific functions, which is more suitable to describe the execution process of the device of displaying comment information in the storage medium than the program itself, the following description will specifically introduce functions of the program modules of this embodiment.

As shown in FIG. 8, the device of displaying comment information 800 may include a position obtaining module 801, a determining module 802, a comment obtaining module 803 and a playing module 804, wherein:

The position obtaining module 801, obtaining camera position information of a mobile terminal located in a camera coordinate system.

Specifically, the camera position information indicates a coordinate of the mobile terminal in the camera coordinate system. In this embodiment, when the mobile terminal uses AR to display the comment information, it will start AR comment program and call its own optical system, such as a camera set including lens, shutter, image sensors, etc., an inertial measurement unit (IMU) and AR software tool development kits to collect and calculate position information (x, y, z) and directions (pitch, yaw, and roll) of the device, wherein, the IMU can be an accelerometer or a gyroscope.

It should be noted that the position information (x, y, z) is the coordinate in the camera coordinate system.

Among them, the camera coordinate system is a three-dimensional rectangular coordinate system established with the focus center of the camera as an origin and the optical axis as a Z axis. The origin of the camera coordinate system (an observation coordinate system), is an optical center of the camera, an x axe and a y axe are parallel to an X axe and a Y axe of an image, and a z axis is the optical axis of the camera, which is perpendicular to an image plane. An intersection of the optical axis and the image plane is an origin of the image coordinate system, the image coordinate system is a two-dimensional rectangular coordinate system.

The determining module 802, converting the camera position information to spatial position information located in a world coordinate system.

The spatial position information is a coordinate of the comment information to be displayed in the world coordinate system. The coordinate in the camera coordinate system can be converted to the coordinate in the world coordinate system through a conversion formula between the camera coordinate system and the world coordinate system.

In an exemplary embodiment, the determining module 802, calculating comment generating position information of the comment information to be displayed in the camera coordinate system according to the camera position information Specifically, the comment generating position information is a coordinate of the comment information to be informed in the camera coordinate system.

In this embodiment, in order to display the comment information more randomly and dispersedly, an initial position of a comment display can be optimized, that is, a generating position of the comment can be preset. In one embodiment, the initial position optimization can be performed specifically using the following methods: firstly, the camera position information of the mobile terminal is obtained, wherein, in the camera coordinate system, the camera position information is represented by a homogeneous coordinate system as $$p1 = \begin{bmatrix} x1 \\ y1 \\ z1 \\ 1 \end{bmatrix};$$

secondly, after the camera position information of the mobile terminal is obtained, through a translation and/or a rotation transformation to the camera position p1, and finally position information is obtained after the translation and/or the rotation transformation is calculated, and the position information is served as random and scattered comment generating position information, wherein, in the camera coordinate system, transformed camera position information is represented by the homogeneous coordinate system as $$p2 = \begin{bmatrix} x2 \\ y2 \\ z2 \\ 1 \end{bmatrix}.$$

In this embodiment, a specific distance of translation and a rotation angle can be preset or set by a user, which is not limited in this embodiment.

The determining module 802, determining the spatial position information according to the comment generating position information.

Specifically, a transformation relationship of the comment information to be displayed is pre-stored in the mobile terminal, the transformation relationship is used to determine the generating position of the comment information to be displayed. Exemplarily, the transformation relationship may be: translating 'a' units to the x-axis and rotating angle 'b' in the pitch direction. In this embodiment, the transformation relationship can be correspondingly changed according to a movement and a rotation of the camera. A changed transformation relationship may be automatically maintained by the operating system and SDK of the mobile terminal.

After the comment generating position information is obtained, the spatial position information corresponding to the comment generating position information can be calculated according to the transformation relationship. In other words, the conversion between the camera coordinate system and the world coordinate system is calculated according to this transformation relationship.

The comment obtaining module 803, obtaining the comment information to be displayed.

Specifically, the comment (barrage), refers to the commentary subtitles that pop up when watching videos on the Internet. Similar to the criticism between the lines in the novel, the comments floating across the screen in the video are called the comment, which originally meant to provide intensive shelling with a large or small amount of artillery. The comment, as the name suggests, refers to a curtain formed by a large number of bullets, when a large number of complaints float across the screen, the effect looks like comments in a flying shooting game.

The comment information to be displayed is the user's comment information. In an embodiment, the comment information may specifically refer to a user's comment on a certain item, or a user's comment on a certain place, or a user's comment on a certain event. In this embodiment, the comment information may be represented in a text form, in another embodiment, the comment information may also be represented in any form that can be converted into a 3D model, such as pictures, 3D models or videos.

The comment information to be displayed is stored in a server, when the comment information needs to be displayed, the comment information to be displayed can be obtained from the server through a comment obtaining instruction.

In an exemplary embodiment, the comment obtaining module 803, obtaining an object image of an object to be recognized.

Specifically, when the user needs to obtain the user's comment information for a certain object to be recognized, the user can take a photo of the object to be recognized through the camera of the mobile terminal, so that the mobile terminal can obtain the object image of the object to be recognized. In another embodiment, the object image of the object to be recognized can also be directly obtained from an album in the mobile terminal.

The comment obtaining module 803, recognizing the object image through an object recognition technology to obtain a category of the object to be recognized.

Specifically, an object recognition model trained by Deep Learning technology can be used to perform image recognition on the object image, thereby the category of the object is identified. During a training process of the object recognition model, in order to improve accuracy of model recognition, pictures in a used training sample data set can be performed data enhancement processing to the pictures in a sample data set by clipping, rotating and other methods, thereby improving diversity of the sample data set and making the object recognition models trained through the training sample data set have a better recognition rate.

The comment obtaining module 803, obtaining comment information relating to the category of the object from the server according to the category of the object, the comment information is the comment information to be displayed.

Specifically, after the category of the object is recognized, category information of the object is transmitted to the server, then the server searches for comment information associated with the category of the object according to the acquired category information of the object.

Exemplarily, the category of the object takes a hand-made good as an example, when the user sees a hand-made product, the user can take a picture of the hand-made product through the mobile terminal, and then the mobile terminal recognizes the picture of the hand-made product, after the category of the picture of the hand-made product is recognized, the category information of the picture of the hand-made product is transmitted to the server, the server finds the comment information associated with the hand-made product according to the category information. Among them, the mobile terminal can use off-line image recognition technology to recognize the hand-made good to obtain a higher-quality data set and improve recognition accuracy.

It is understandable that each user can publish comment information on the hand-made product through a user interface of playing the comment information to be displayed, after the user publishes the comment information through the user interface, the mobile terminal transmits the comment information to the server, the server saves the relationship between the user comment information and the corresponding hand-made product in a comment database.

In another exemplary embodiment, the comment obtaining module 803, obtaining geographical location information of the mobile terminal.

Specifically, the geographic location information where the mobile terminal is located can be obtained by calling a positioning module of the mobile terminal.

The comment obtaining module 803, obtaining comment information relating to the geographical location information from a server according to the geographical location information, the comment information is the comment information to be displayed.

Specifically, when a user publishes comment information, the geographic location where the user published the comment information can be obtained, after the user posts the comment information through the mobile terminal, the mobile terminal uploads the comment information containing the geographic location information to the server, after receiving the comment information containing the geographic location information, the server stores the comment information containing the geographic location information. It is understood that after the server stores the comment information containing the geographic location information, the background manager can review the comment information containing the geographic location information published by the user, and can delete the comment information when the comment information is inappropriate.

Since the comment information posted by the user includes the geographic location information, after the geographic location information of the mobile terminal is obtained, comment information associated with the geographic location information can be obtained from the server according to the geographic location information.

In this embodiment, the comment information can be location comment information, that is, a user's comment on a certain location, the location comment can be presented in the text form or in any form that can be converted into a 3D model, such as pictures, 3D models or videos. When the comment information exists in the form of a video, the comment information also includes video URL, information of the video.

Exemplarily, when a user eats at a restaurant, the user can post comment information on the restaurant, for example, the food of the restaurant tastes good, the user can also publish a video of the environment of the restaurant. When the user posts the comment information through the mobile terminal, the mobile terminal obtains the geographic location information where the user posts the comment information, and then uploads the comment information containing the geographic location information to the server. In this way, after the geographic location information is obtained, the mobile terminal can obtain the comment information associated with the geographic location information from the server according to the geographic location information obtained.

It is understood that each user can post location comment information on a certain location through a user interface of playing the comment information to be displayed, after the user posts the location comment information through the user interface, the mobile terminal transmits the location comment information to the server, the server saves the user's location comment information and the corresponding geographic location information to the comment database. When the comment information posted by the user is a video, after the mobile terminal uploads the video to the server, the server associates the URI, information corresponding to the video with the corresponding geographic location information and saves them in the comment database.

The playing module 804, displaying the comment information to be displayed according to the spatial position information.

Specifically, after the spatial location information of the comment information to be displayed is obtained, the mobile terminal can play each piece of the comment information to be displayed according to a display size, a font color, a font format and display effects of each piece of the comment information. Wherein the display special effects include dwell, scroll or other special effects.

In an exemplary embodiment, the playing module 804, obtaining a motion track and a motion speed of the comment information to be displayed, and playing the comment information to be displayed according to the motion track and the motion speed.

Specifically, the movement track and movement speed of the comment information can be preset, for example, the preset movement track of the comment, relative to the current position of the camera, is from right to left, and a movement vector is denoted as 'a', after the preset movement vector 'a' is obtained, the preset movement vector 'a' is converted into a vector 'a'' in the world coordinate system.

After the spatial position information of the comment information to be displayed is obtained and the vector 'a'' in the world coordinate system corresponding to the movement track of the comment is calculated, a comment model is generated in the spatial position information, then the comment model is moved with a movement speed S according to the vector 'a'' in the world coordinate system, thereby completing the playback of the comment information to be displayed.

In this embodiment, based on different operating systems or SDKs, different degrees of self-defined effects of the comment model can be achieved. For example, different fonts, colors, lighting shadow effects and so on can be applied to the comment model, in addition to a text model, image textures can be used to cover the 3D model.

In one embodiment, after the comment is moved to a preset position, comment resources can be recovered.

In another embodiment, after the comment information is displayed, the user can perform interactive operations on the comment information, for example, the user can change the movement track of a comment by clicking or sliding operations. For example, the user can switch the movement the track of one comment to another movement track through a sliding operation, after the user's switching operation on the movement track of the comment is received, the mobile terminal can re-determine a direction vector corresponding to the movement track of the comment according to the user's sliding operation, after a directional vector corresponding to a new movement track is determined, the directional vector is converted to a directional vector in the corresponding world coordinate system, and finally the comment information is played according to the directional vector in the world coordinate system.

In this embodiment, the camera position information of the mobile terminal in the camera coordinate system is obtained; the camera position information is converted into spatial position information in the world coordinate system; the comment information to be displayed is obtained; and the comment information to be displayed is displayed according to the spatial position information. The embodiment of the present invention displays the comment information through the Augmented Reality (AR) technology, so that the comment information can be displayed in the real space to make the user can truly experience the feeling of the comment floating in the air and improve the user experience, in addition, displaying the comment information through the AR technology enables more diverse interactions.

In an exemplary embodiment, referring to FIG. 8, the device of displaying comment information 800 further includes a receiving module 805.

The receiving module 805, displaying a page corresponding to a hyperlink comment when a user's click operation on a played hyperlink comment is received.

Specifically, the comment information to be displayed may be the hyperlink comment, when the comment information to be displayed includes a hyperlink comment, the user can click on the hyperlink comment played in the video interface, after the user's click operation on the hyperlink comment is received, the mobile terminal obtains corresponding page contents according to the hyperlink and displays the page contents.

In this embodiment, by providing the hyperlink comment, the user can click on the hyperlink comment to enter the page corresponding to the hyperlink, thereby increasing interactive manners of the comment and improving user experience.

Fourth Embodiment

Figure 9:
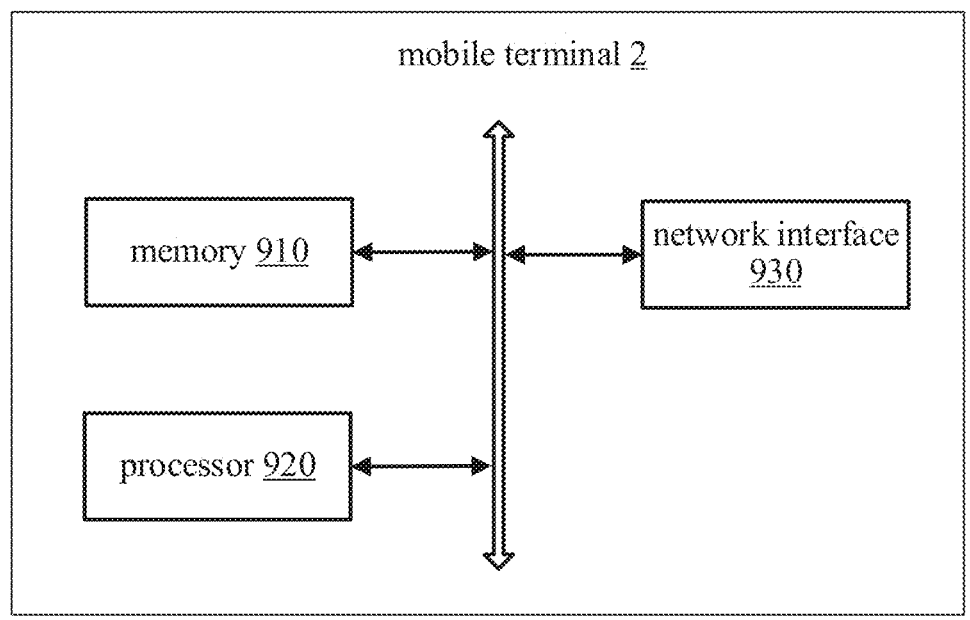
FIG. 9 is a schematic diagram of an embodiment of the hardware architecture of a mobile terminal performing the method of displaying comment information of the present invention.

FIG. 9 is a schematic diagram of the hardware architecture of a mobile terminal performing the method of displaying comment information according to a fourth embodiment of the present application. In this embodiment, the mobile terminal 2 is a device that can automatically perform numerical calculation and/or information processing according to pre-set or stored instructions. Such as, a smartphone, a tablet computer, a laptop computer, a desktop computer, a rack server, a blade server, a tower server, or a cabinet server (including an independent server, or a server cluster composed of multiple servers), etc. As shown in FIG. 9, the mobile terminal 2 includes at least but not limited to: a memory 910, a processor 920 and a network interface 930 that can communicate with each other through a system bus. Wherein:

The memory 910 include at least one type of computer-readable storage medium, and the readable storage medium includes a flash memory, a hard disk, a multimedia card, a card-category memory (for example, SD or a DX memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, etc. In some embodiments, the memory 910 may be an internal storage unit of the mobile terminal 2, such as a hard disk or memory of the mobile terminal 2. In other embodiments, the memory 910 may also be an external storage device of the mobile terminal 2, for example, a plug-in hard disk equipped on the mobile terminal 2, a smart memory card (SMC), or a secure digital (SD) card, a flash card, etc. Of course, the memory 910 may also include both the internal storage unit of the mobile terminal 2 and its external storage device. In this embodiment, the memory 910 is generally used to store an operating system and various application software installed on the mobile terminal 2, such as program codes of the device of displaying comment information and so on. In addition, the memory 910 can also be used to temporarily store various types of data that have been outputted or will be outputted.

The processor 920 may be a Central Processing Unit (CPU), a controller, a microcontroller, a microprocessor, or any other data processing chip in some embodiments. The processor 920 is generally used to control the overall operation of the mobile terminal 2, for example, control and processing related to data interactions or communications with the mobile terminal 2 are performed. In this embodiment, the processor 920 is configured to run program codes or processing data stored in the memory 910.

The network interface 930 may include a wireless network interface or a wired network interface, the network interface 930 is generally used to establish a communication link between the mobile terminal 2 and other mobile terminals. For example, the network interface 930 is used to connect the mobile terminal 2 to external terminals through a network, and to establish a data transmission channel and a communication link between the mobile terminal 2 and the external terminals. The network can be the Intranet, the Internet, Global System of Mobile communication (GSM), Wideband Code Division Multiple Access (WCDMA), 4G network, 5G network, Bluetooth (Bluetooth), Wi-Fi and other wireless or wired networks.

It should be noted that FIG. 9 only shows the mobile terminal having the components 910~930, but it should be understood that it is not required to implement all the displayed components, and more or fewer components may be implemented instead.

In this embodiment, the method of displaying comment information stored in the memory 910 can also be divided into one or more program modules and executed by one or more processors this embodiment, the processor 920) to complete the present invention.

Sixth Embodiment

This embodiment also provides a computer-readable storage medium on which computer programs are stored upon, and when the computer programs are executed by a processor, the steps of the method of displaying comment information in the embodiment are implemented.

In this embodiment, the computer-readable storage medium includes a flash memory, a hard disk, a multimedia card, a card-type memory (for example, SD or DX memory, etc.), a random access memory (RAM), a static random access memory (SRAM), a read only memory (ROM), an electrically erasable programmable read-only memory (EEPROM), a programmable read-only memory (PROM), a magnetic memory, a magnetic disk, an optical disk, a server, an APP store, etc. In some embodiments, the computer-readable storage medium may be an internal storage unit of the mobile terminal, such as a hard disk or memory of the mobile terminal. In other embodiments, the computer-readable storage medium may also be an external storage device of the mobile terminal, such as a plug-in hard disk equipped on the mobile terminal, a smart memory card (SMC), a secure digital (SD) card, Flash Card, etc. Of course, the computer-readable storage medium may also include both the internal storage unit and the external storage device of the mobile terminal. In this embodiment, the computer-readable storage medium is generally used to store the operating system and various application software installed in the mobile terminal, such as the program codes of the method of displaying comment information in the embodiment. In addition, the computer-readable storage medium can also be used to temporarily store various types of data that have been output or will be output.

Obviously, those skilled in the art should understand that the modules or steps of the above-mentioned embodiments of the present invention can be implemented by a general computing device, and they can be concentrated on a single computing device, or distributed among multiple computing devices, optionally, they can be implemented with program codes executable by a computing device, so that they can be stored in a storage device for execution by the computing device, and in some cases, the steps shown or described can be performed in a different order than here, or they can be made into individual integrated circuit modules, or multiple modules or steps among them can be made as a single integrated circuit module to implement the invention. In this way, the embodiments of the present invention are not limited to any specific combination of hardware and software.

The above are only the preferred embodiments of the present invention, and do not limit the scope of the present invention, any equivalent structure or equivalent process transformation is made by using the content of the description and drawings of the present invention, or directly or indirectly applied to other related technical fields, the same reason is included in the scope of patent protection of the present invention.

What is claimed is:

1. A method of displaying comment information, comprising:
   determining position information of a mobile terminal in a first coordinate system, the mobile terminal comprising a camera, a focus point of the camera being an origin of the first coordinate system, wherein the first coordinate system is a camera coordinate system established with the focus of the camera as the origin of the camera coordinate system;
   determining first position information associated with at least one comment in the camera coordinate system based on the position information of the mobile terminal, wherein the determining first position information associated with at least one comment in the first coordinate system further comprises:
      optimizing initial position information associated with the at least one comment in the first coordinate system, and
      determining the first position information associated with the at least one comment based on the optimized initial position information, wherein the first position information associated with the at least one comment enables the at least one comment to be displayed in a random and dispersed manner;
   converting the first position information associated with the at least one comment to second position information associated with the at least one comment in a second coordinate system based on one or more predetermined rules, wherein the second coordinate system is a world coordinate system, and the second position information associated with the at least one comment is spatial position information comprising coordinates of the at least one comment to be displayed in the world coordinate system;
   obtaining the at least one comment;
   displaying the at least one comment based on the spatial position information associated with the at least one comment in the world coordinate system;
   wherein the method further comprises:
   determining a motion track and a motion speed with which the at least one comment is to be displayed in the world coordinate system based on converting a predetermined vector into a vector in the world coordinate system;
   displaying the at least one comment according to the motion track and the motion speed in the world coordinate system, wherein the at least one comment is displayed by moving across a real space;
   receiving user input indicative of changing the motion track to a new movement track;
   determining a new directional vector corresponding to the new movement track; and
   displaying the at least one comment in the real space based on the new directional vector corresponding to the new movement track.

2. The method of claim 1, wherein the at least one comment comprises at least one of text, an image, or a video.

3. The method of claim 1, further comprising:
   recognizing an object using an object recognition model;
   determining a category of the object; and
   obtaining comment information associated with the category of the object from a server for display of comments associated with the category of the object in the second coordinate system.

4. The method of claim 1, further comprising:
   determining a geographical location of the mobile terminal; and
   obtaining comment information associated with the geographical location from a server for display of comments associated with the geographical location in the second coordinate system.

5. The method of claim 4, wherein the at least one comment comprises one or more comments on an object associated with the geographical location.

6. The method of claim 5, wherein the at least one comment comprises a Uniform Resource Locator (URL) of a video associated with the object.

7. The method of claim 1, further comprising:
   in response to receiving a user's click operation on a hyperlink included in the at least one comment, displaying a web page corresponding to the hyperlink.

8. A system of displaying comment information, comprising:
   at least one processor; and
   at least one memory communicatively coupled to the at least one processor and storing instructions that upon execution by the at least one processor cause the system to:
   determine position information of a mobile terminal in a first coordinate system, the mobile terminal comprising a camera, a focus point of the camera being an origin of the first coordinate system, wherein the first coordinate system is a camera coordinate system established with the focus of the camera as the origin of the camera coordinate system;
   determine first position information associated with at least one comment in the camera coordinate system based on the position information of the mobile terminal, wherein determining first position information associated with at least one comment in the first coordinate system further comprises:
      optimizing initial position information associated with the at least one comment in the first coordinate system, and
      determining the first position information associated with the at least one comment based on the optimized initial position information, wherein the first position information associated with the at least one comment enables the at least one comment to be displayed in a random and dispersed manner;
convert the first position information associated with the at least one comment to second position information associated with the at least one comment in a second coordinate system based on one or more predetermined rules, wherein the second coordinate system is a world coordinate system, and the second position information associated with the at least one comment is spatial position information comprising coordinates of the at least one comment to be displayed in the world coordinate system;
obtain the at least one comment;
display the at least one comment based on the spatial position information associated with the at least one comment in the world coordinate system;
wherein the at least one memory further storing instructions that upon execution by the at least one processor cause the system to:
determine a motion track and a motion speed with which the at least one comment is to be displayed in the world coordinate system based on converting a predetermined vector into a vector in the world coordinate system;
display the at least one comment according to the motion track and the motion speed in the world coordinate system, wherein the at least one comment is displayed by moving across a real space;
receive user input indicative of changing the motion track to a new movement track;
determine a new directional vector corresponding to the new movement track; and
display the at least one comment in the real space based on the new directional vector corresponding to the new movement track.

9. The system of claim 8, wherein the at least one comment comprises at least one of text, an image, or a video.

10. The system of claim 8, the at least one memory further storing instructions that upon execution by the at least one processor cause the system to:
recognize an object using an object recognition model;
determine a category of the object; and
obtain comment information associated with the category of the object from a server for display of comments associated with the category of the object in the second coordinate system.

11. The system of claim 8, the at least one memory further storing instructions that upon execution by the at least one processor cause the system to:
determine a geographical location of the mobile terminal; and
obtain comment information associated with the geographical location from a server for display of comments associated with the geographical location in the second coordinate system.

12. The system of claim 11, wherein the at least one comment comprises one or more comments on an object associated with the geographical location.

13. The system of claim 12, wherein the at least one comment comprises a Uniform Resource Locator (URL) of a video associated with the object.

14. The system of claim 8, the at least one memory further storing instructions that upon execution by the at least one processor cause the system to:
in response to receiving a user's click operation on a hyperlink included in the at least one comment, display a web page corresponding to the hyperlink.

15. A non-transitory computer-readable storage medium, storing computer-readable instructions that upon execution by a processor cause the processor to implement operations comprising:
determining position information of a mobile terminal in a first coordinate system, the mobile terminal comprising a camera, a focus point of the camera being an origin of the first coordinate system, wherein the first coordinate system is a camera coordinate system established with the focus of the camera as the origin of the camera coordinate system;
determining first position information associated with at least one comment in the camera coordinate system based on the position information of the mobile terminal, wherein the determining first position information associated with at least one comment in the first coordinate system further comprises:
optimizing initial position information associated with the at least one comment in the first coordinate system, and
determining the first position information associated with the at least one comment based on the optimized initial position information, wherein the first position information associated with the at least one comment enables the at least one comment to be displayed in a random and dispersed manner;
converting the first position information associated with the at least one comment to second position information associated with the at least one comment in a second coordinate system based on one or more predetermined rules, wherein the second coordinate system is a world coordinate system, and the second position information associated with the at least one comment is spatial position information comprising coordinates of the at least one comment to be displayed in the world coordinate system;
obtaining the at least one comment;
displaying the at least one comment based on the spatial position information associated with the at least one comment in the world coordinate system;
wherein the operations further comprise:
determining a motion track and a motion speed with which the at least one comment is to be displayed in the world coordinate system based on converting a predetermined vector into a vector in the world coordinate system;
displaying the at least one comment according to the motion track and the motion speed in the world coordinate system, wherein the at least one comment is displayed by moving across a real space;
receiving user input indicative of changing the motion track to a new movement track;
determining a new directional vector corresponding to the new movement track; and
displaying the at least one comment in the real space based on the new directional vector corresponding to the new movement track.

16. The non-transitory computer-readable storage medium of claim 15, the operations further comprising:
recognizing an object using an object recognition model;
determining a category of the object; and
obtaining comment information associated with the category of the object from a server for display of comments associated with the category of the object in the second coordinate system.

17. The non-transitory computer-readable storage medium of claim 15, the operations further comprising:

determining a geographical location of the mobile terminal; and obtaining comment information associated with the geographical location from a server for display of comments associated with the geographical location in the second coordinate system.

* * * * *